United States Patent
Ordonez et al.

(10) Patent No.: US 7,908,159 B1
(45) Date of Patent: Mar. 15, 2011

(54) METHOD, DATA STRUCTURE, AND SYSTEMS FOR CUSTOMER SEGMENTATION MODELS

(75) Inventors: Carlos Ordonez, San Diego, CA (US); Mike Chiufang Hsiao, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 1471 days.

(21) Appl. No.: 10/365,038

(22) Filed: Feb. 12, 2003

(51) Int. Cl.
*G06F 9/44* (2006.01)

(52) U.S. Cl. .................................................. 705/7
(58) Field of Classification Search .................. None
See application file for complete search history.

(56) References Cited

U.S. PATENT DOCUMENTS

| | | | |
|---|---|---|---|
| 5,884,305 A * | 3/1999 | Kleinberg et al. | 707/6 |
| 5,974,396 A * | 10/1999 | Anderson et al. | 705/10 |
| 6,009,407 A * | 12/1999 | Garg | 705/10 |
| 6,029,139 A | 2/2000 | Cunningham et al. | |
| 6,032,146 A * | 2/2000 | Chadha et al. | 707/6 |
| 6,292,786 B1 | 9/2001 | Deaton et al. | |
| 6,298,330 B1 | 10/2001 | Gardenswartz et al. | |
| 6,317,722 B1 | 11/2001 | Jacobi et al. | |
| 6,334,110 B1 | 12/2001 | Walter et al. | |
| 6,377,935 B1 | 4/2002 | Deaton et al. | |
| 6,430,539 B1 * | 8/2002 | Lazarus et al. | 705/10 |
| 6,581,058 B1 * | 6/2003 | Fayyad et al. | 707/6 |
| 6,728,728 B2 * | 4/2004 | Spiegler et al. | 707/103 R |
| 6,735,589 B2 * | 5/2004 | Bradley et al. | 707/6 |
| 6,862,574 B1 * | 3/2005 | Srikant et al. | 705/10 |
| 6,928,434 B1 * | 8/2005 | Choi et al. | 707/6 |
| 6,934,687 B1 * | 8/2005 | Papierniak et al. | 705/10 |
| 6,954,758 B1 * | 10/2005 | O'Flaherty | 707/102 |
| 7,035,811 B2 * | 4/2006 | Gorenstein | 705/10 |
| 7,069,197 B1 * | 6/2006 | Saidane | 703/2 |
| 7,165,037 B2 * | 1/2007 | Lazarus et al. | 705/10 |
| 2002/0078064 A1 * | 6/2002 | Bisgaard-Bohr et al. | 707/103 R |
| 2002/0087567 A1 * | 7/2002 | Spiegler et al. | 707/100 |
| 2002/0099581 A1 * | 7/2002 | Chu et al. | 705/7 |
| 2002/0123923 A1 * | 9/2002 | Manganaris et al. | 705/10 |
| 2002/0184075 A1 * | 12/2002 | Hertz et al. | 705/10 |
| 2003/0055707 A1 * | 3/2003 | Busche et al. | 705/10 |
| 2004/0103051 A1 * | 5/2004 | Reed et al. | 705/36 |

OTHER PUBLICATIONS

Claudio Marcus, "A practical yet meaningful approach to customer segmentation," 15 J. Consumer Marketing 494 (Issue 5, 1998).*
Yoram Wind, "Issues and Advances in Segmentation Research," 15 J. Marketing Research 317 (Aug. 1978).*
Chris Rygielski et al., "Data mining techniques for customer relationship management," 24 Technology in Society 483 (2002).*

(Continued)

*Primary Examiner* — Romain Jeanty
*Assistant Examiner* — Brett Feeney
(74) *Attorney, Agent, or Firm* — Schwegman, Lundberg & Woessner (57) ABSTRACT

Methods, data structures, and systems for generating customer segmentation models are provided. Basket transactions are analyzed and classified into a first segment type, a second segment type, a third segment type, or a fourth segment type. A number of the basket transaction within a number of the segment types are separately analyzed to determine sub classifications or sub segments within a particular segment type. Each basket transaction is augmented with a segment type that identifies the segment type classification, and a number of the basket transactions include a segment identifier that identifies the sub segment within a segment type that a basket transaction is associated with. The augmented basket transactions represent a customer segmentation model. In one embodiment, daily transactions are monitored by a script and used to dynamically adjust the customer segmentation model.

13 Claims, 2 Drawing Sheets

OTHER PUBLICATIONS

Vicki G. Morwitz & David C. Schmittlein, "Testing New Direct Marketing Offerings: The Interplay of Management Judgment and Statistical Models," 44 Management Science 610 (May 1998).*

Dr. Gianfranco Walsh, et al., "Consumers' decision-making style as a basis for market segmentation," 10 J. of Targeting, Measurement and Analysis for Marketing 117 (Dec. 2001).*

Brian Wansink & Sea Bum Park, "Comparison Methods for Identifying Heavy Users," 40 J. Advertising Research 61 (Jul./Aug. 2000).*

Evangelos Simoudis, "Reality Check for Data Mining," IEEE Expert 0885-9000/96 (1996).*

Catherine Bounsaythip & Esa Rinta-Runsala, "Overview of Data Mining for Customer Behavior Modeling," VTT Info. Tech. Research Report TTE1-2001-18 (Jun. 2001).*

David R. Bell et al., "Determining Where to Shop: Fixed and Variable Costs of Shopping," 35 J. Marketing Res. 352 (Aug. 1998).*

Kristy E. Reynolds et al., "Traditional malls vs. factory outlets: comparing shopper typologies and implications for retail strategy," 55 J. Bus. Res. 687 (2002).*

Ronald J. Brachman et al., "Mining Business Databases," Communications of the ACM, vol. 39, No. 11, p. 42 (Nov. 1996).*

Venkatesh Ganti et al., "Mining Very Large Databases," IEEE Pub 0018-9162 at 38 (1999).*

Tucker L (1944). The Determination of Successive Principal Components Without Computation of Tables of Residual Correlation Coefficients Psychometrika. 9(3): 149-153.*

* cited by examiner

FIG. 1

METHOD, DATA STRUCTURE, AND SYSTEMS FOR CUSTOMER SEGMENTATION MODELS

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright © 2003, NCR Corp. All Rights Reserved.

FIELD OF THE INVENTION

The present invention relates to customer segmentation models, and in particular to methods and systems that segment and profile customers by analyzing transactions of an enterprise or a store of the enterprise.

BACKGROUND OF THE INVENTION

By and large, an enterprise records purchasing transactions associated with customers for later analysis. These purchasing transactions are sometimes referred to as basket transactions. Typically, although not always, the data associated with a basket transaction is automatically captured in an electronic environment at the time of a sale through automated input devices (e.g., scanners, cash registers, World-Wide Web (WWW) accesses, and the like). In some cases, a basket transaction can be manually collected and later entered into the electronic environment. Furthermore, in some cases, a single basket transaction is automatically captured and later augmented with additional data that is manually entered into an electronic environment.

Today individuals are increasingly purchasing goods and services with credit cards, loyalty cards, and through online transactions over the WWW. Moreover, nearly all goods and services have unique identifiers (e.g., bar codes) that uniquely and automatically identify the type of good or service being sold along with additional information such as department and origin of the good or service being sold. This additional information improves the enterprise's inventory management, planning, and forecasting.

One purpose of recording basket transactions and data related to the basket transactions is to permit an enterprise to more intelligently analyze past sales transactions. The analysis is used to plan and project future sales with the hope that the enterprise can continue doing things that it does well and can improve on things that it may not do well in order to improve sales and profits. One critical aspect in this analysis is to identify different segments of customers that frequent the enterprise and better understand how and why these segments make purchases within the enterprise.

Conventionally, enterprises favor data mining applications as tools for classify large volumes of basket transactions into related segments. The related segments are then viewed for trends or relationships that can assist the enterprise in planning and/or making changes to improve sales.

Conventionally, customer segmentation applications use clustering applications. Clustering applications identify transactions with data that is similar to other transactions and data that is not similar to other transactions. Once these similarities and dissimilarities are discovered then the basket transactions are grouped into similar segments or dissimilar segments. The resulting segments can then be fed to reporting applications (e.g., Online Analytical Processing (OLAP) applications, and others) to generate reports about similar or dissimilar segments.

One of ordinary skill in the art readily appreciates, that clustering applications combined with OLAP reporting applications are not enough for an enterprise to efficiently discern relationships within or between segments. This is so, because OLAP reports are built on predefined or static business requirements. Therefore, the enterprise must have a good idea of what information needs to be reported before developing an OLAP report. Moreover, clustering alone is not good enough for enterprises with high dimensional data, such as when enterprises have many departments and product categories. Also, even if a clustering technique could effectively cluster high dimensional data, the results produced are difficult to interpret. Furthermore, clustering applications combined with a predefined OLAP report will only permit the enterprise to identify and summarize identified segments, but substantial customized report development still needs to occur in order for the enterprise to fully comprehend the effects of the discovered segments on the enterprise.

Therefore, there exist needs for providing techniques that more efficiently and automatically identify customer segmentation from basket transactions. With such techniques, enterprises can more timely and efficiently react and adjust to their environment, customers, and markets.

SUMMARY OF THE INVENTION

In various embodiments of the present invention methods, data structures, and systems are described to generate customer segmentation models by analyzing basket transactions of an enterprise. More specifically, and in one embodiment, a method to generate a customer segmentation model is presented. Initially, basket transactions are repetitively analyzed and classified into a first segment type, a second segment type, a third segment type, or a fourth segment type. Next, a number of basket transactions are analyzed and classified within a number of the segment types to further sub classify a number of the basket transactions into sub segments. Finally, a customer segmentation model is generated by supplying each of the basket transactions with a segment type value that identifies the first segment type, the second segment type, the third segment type, or the fourth segment type, and supplying a number of the basic transactions with a segment identifier that identifies one of a number of sub segments within a number of the segment types.

In still another embodiment of the present invention, a customer segmentation model data structure, residing on a computer readable medium is presented. The customer segmentation model data structure includes factor data fields, cluster data fields, a segment type field, and a segment identifier field. One or more factor analysis applications use the factor data fields to classify each of the basket transactions into a first segment type, a second segment type, a third segment type, or a fourth segment type. One or more clustering applications use the cluster data fields to sub classify basket transactions into one of a number of sub segments within a number of the segment types. Moreover, the segment type field includes a segment type value that identifies one of the segment types. Also, the segment identifier field includes a segment identifier value that identifies one of a number of the sub segments and the clustering application used to determine an appropriate sub segment.

In yet another embodiment of the present invention, a customer segmentation system is described. The customer segmentation system includes a data store, a clustering application, a factor analysis application, and a model generation application. The data store houses basket transactions. The model generation application generates a customer segmentation model based on results of the factor analysis application that classifies the basket transactions into a first segment type, a second segment type, a third segment type, and a fourth segment type. The model generation application also generates the customer segmentation model based on results of the clustering application that sub classifies a number of the basket transactions from a number of the segment types into one of a number of sub segments. Each basket transaction receives a segment type representing the first segment type, the second segment type, the third segment type, or fourth segment type. Moreover, a number of the basket transactions receive a segment identifier representing one of the number of sub segments.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

In various embodiments of the present invention, basket transactions are used to refer to transactional data captured by an enterprise. This transactional data includes sales data for goods and services and additional information regarding a sale, such as date, time, terminal of sale, salesperson, store identification, product identification, price, customer identification, and the like. Although, as will become apparent to one of ordinary skill in the art, the identity of a customer is not required, and in some instances intentionally not used, with the tenets of the present disclosure. As is apparent to one of ordinary skill in the art, conventional segmentation techniques rely on a customer's identity, but the tenets of the present disclosure does not need to use the customer's identity at all. In one embodiment, the basket transactions are captured and recorded in a data warehouse, such as the Teradata warehouse, distributed by NCR Corporation of Dayton, Ohio. Various data store applications interface to the data store for acquiring and augmenting the basket transaction data. Of course as one of ordinary skill in the art readily appreciates, any data store (e.g., database, data warehouse, electronic files, and others) and data store applications can be used with the teachings of the present disclosure. Thus, all such data stores and applications fall within the scope of the present invention.

In various embodiments of the present disclosure, the basic input or data analyzed by the segmentation models of the present invention is a summarized transaction table. This transaction table can be referred to as a basket table or basket transactions. The table is built from detailed transaction information available in a data store of an enterprise. This table includes on record per purchased item within a store of an enterprise. Organization and collection of the data in the table can occur in any fashion, including combinations of automated techniques and manual techniques.

Various embodiment of the present invention employ a plurality of data mining applications that are used to classify and analyze the basket transactions of an enterprise, a store or an enterprise, a department of a store, and the like. In fact, any use of the term enterprise is intended to include different logical subcomponents of an enterprise, such as geographic areas, stores, departments, functional areas, and the like. These data mining applications include at least one clustering application and at least one factor analysis application. The data mining applications can be existing or custom developed applications designed to achieve the tenets of the present invention. Other data mining applications include decision trees, association rules, regression, and the like.

The data mining applications are also used to assist in providing a customer segmentation model to an enterprise. A segment is a group of customers, whose identities are not required, who exhibit similar purchasing preferences. The customer segmentation model is modified and organized basket transaction data that include one or more fields with augmented information provided by performing various techniques of the present invention, discussed in detail below. These modified basket transactions can then be provided to one or more report applications to generate more intelligent reports about an enterprise's transactions. The modified or augmented basket transactions include, among other things, segment types identifying a segment category and segment identifiers that identify sub classifications within a segment type.

Customer segment types include an irregular segment type, a convenience segment type, a destination segment type, and a variety segment type. In the irregular segment type, a transaction characteristic is identified when data quality problems (e.g., returns, frauds, and the like) are detected. In the convenience segment type, a transaction characteristic is identified by transactions that are primarily made for customer convenience, such as location of items within a store. Moreover, a convenience transaction characteristic typically includes a purchase of only one or a few goods or services of an enterprise. An enterprise may experience a large number of convenience-type transactions when compared to a total number of transactions, but the sales dollar volume is not that large, since a typical convenience transaction usually includes a lower priced good or service.

In the destination segment type, a transaction characteristic is detected when a customer comes to a store of the enterprise with a predefined purpose to buy a specific good or service. A destination segment transaction characteristic includes a customer who will typically purchase higher priced goods or services than a convenience segment transaction, and will generally purchase goods from more than one department during a single transaction with the store.

In the variety segment type, a transaction characteristic is detected when a customer comes to a store in order to shop or to buy from many departments within a store. This segment type customer will usually purchase goods or services from a store of an enterprise from a variety of departments within the store. A variety transaction includes more variety of purchased goods and services than a destination transaction.

A single customer of an enterprise can be associated with all four different customer segmentation types depending upon the basket transaction being made by that customer with the enterprise at any particular point in time. Thus, a customer can make a convenience transaction during the week, and make a destination or variety transaction during a weekend. Moreover, the distinction between the four segments is relative and not intended to be rigid. Finally, as mentioned above, a particular identity of customer need not be known or recorded to achieve the benefits of the present invention.

In addition to segment types, each segment type can be further subdivided into segment identifications that identify sub classifications within a particular segment type. Thus, for example, a variety segment type can be subdivided with segment identifiers to include items purchased categories and departments purchased from categories. In this way, more detailed analysis can be achieved within any particular segment type that has segment identifiers.

Figure 1:
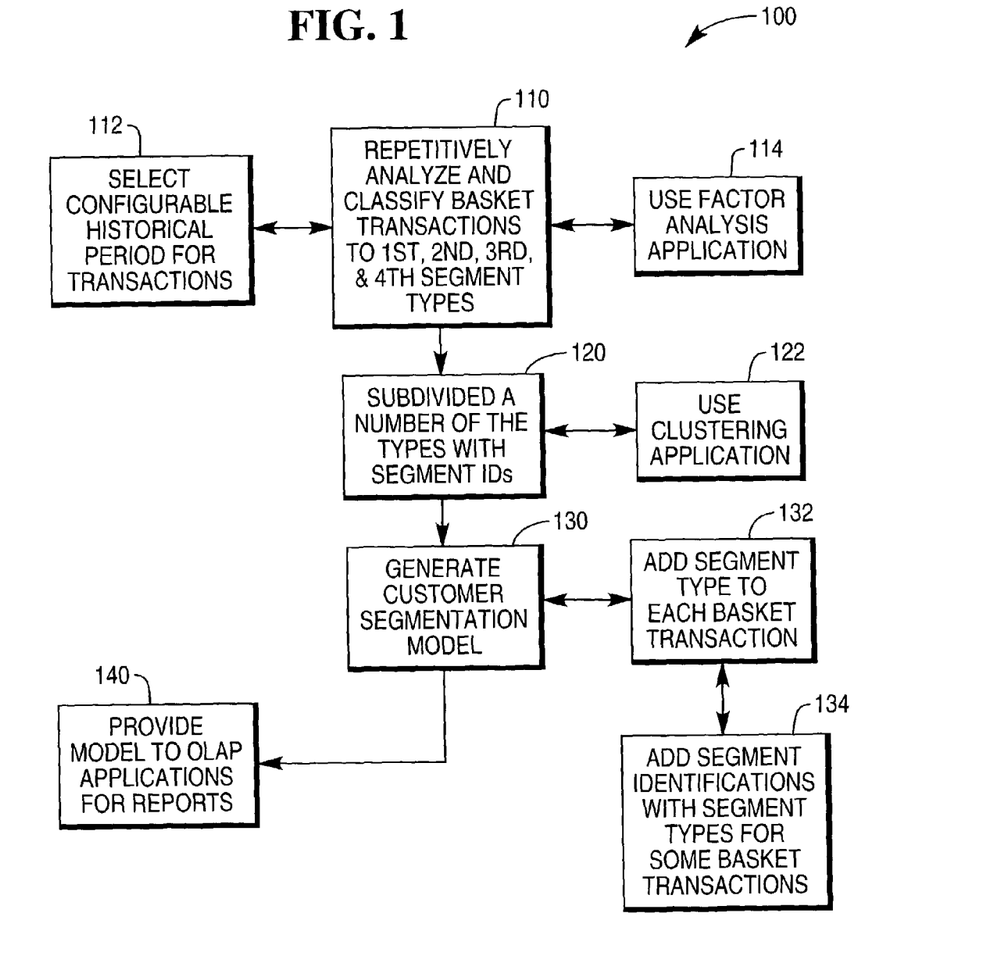
FIG. 1 is a flow diagram representing a method for generating a customer segmentation model, according to the teachings of the present invention.

FIG. 1 illustrates a flow diagram representing one method 100 for generating a customer segmentation model, according to the teachings of the present invention. Method 100 is implemented in an electronic environment where an enterprise's basket transactions are recorded in a computer readable medium. The method 100 can be implemented as a single application or as a plurality of applications interfacing with one another.

Initially, at 110, a group of basket transactions for an enterprise (e.g., store, department, functional area, geographical area, and the like) are analyzed and classified into a first customer segment type, a second customer segment type, a third customer segment type, and a fourth customer segment type. In some embodiments, at 112, the group of basket transactions is selected from a configurable historical period of time. For example, the basket transactions for a store can be retrieved for a one-year period of time, a quarter, a month, a week, or other periods of time.

The first customer segment type is an irregular segment associated with basket transactions that do not fit into a segment type neatly due to data problems. These problems may consist of fraud, returns, and other data quality problems. The second customer segment type is convenience segment type, and the third customer segment type is identified as a destination segment type, and the fourth customer segment type is identified as a variety segment type. In one embodiment, the group of basket transactions is analyzed and classified into the first, second, third, and fourth segments through the use of a factoring analysis application, as depicted at 114. The factor analysis application can be any existing application or custom developed application. The analysis takes multiple processing passes of the basket transactions where initially the irregular segment type is identified on a first pass; the remaining transactions are processed in a second pass to identify the convenience segment type. A third pass identifies the destination segment type, and a fourth pass identifies the variety segment type.

In one embodiment, the factor analysis application uses a Hotelling iterative procedure, which is well known to one of ordinary skill in the art. The Hotelling iterative procedure can be used to find factors from a correlation matrix. Thus, factor analysis is a technique used to group dimensions (data variables) that share common variance into factors. Factor analysis results in dimensionality reduction. Of course it is readily apparent that any existing or custom developed factor analysis application can be used to achieve the tenets of the present disclosure, such as, but not limited to, maximum-likelihood factor analysis, and others. Moreover, a variety of factors can be used to properly execute the factor analysis application, such as aggregated revenue information by store department, and others.

Next, at 120, the segment types are further subdivided into sub classifications within each segment type. In one embodiment, a clustering application at 122 is used to subdivide the third and fourth segment types (e.g., destination and variety, respectively) into subcategories that include, by way of example only, items purchased and departments visited. Of course, as one of ordinary skill in the art readily appreciates a number of other subcategories can be used and in some embodiments it may be desirable to subdivide the first and second segment types (e.g., irregular and convenience, respectively).

In one embodiment, the clustering application uses an Expectation Maximization (EM) algorithm, which is well known to one of ordinary skill in the art. However, it is readily apparent that any clustering algorithm, such as K-means and others can be used to achieve the tenets of the present disclosure. A clustering application is used to group similar points in multidimensional space. In some embodiments, the configured parameters of the clustering application are the total dollar amount of a single basket transaction and the number of goods or services included within the single basket transaction. This will allow the clustering application to analyze the group of basket transactions associated with a defined segment type and subdivide or sub classify the basket transactions into sub categories with the defined segment type (e.g., items purchased, departments visited, and the like). An example technique for performing clustering can be found in U.S. Pat. No. 6,496,834 entitled "Method For Performing Clustering in Very Large Databases," commonly assigned to NCR Corporation of Dayton, Ohio.

Once the group of basket transactions is properly separated into a first segment type (e.g., irregular), a second segment type (e.g. convenience), a third segment type (e.g., destination), and a fourth segment type (e.g., variety), and a number of the segment types are further subdivided into sub classifications, a customer segmentation model is generated at 130. The customer segmentation model is a modified collection of the basket transactions, where each basket transaction includes an additional identification that uniquely identifies the segment type to which that basket transaction is classified. Therefore, at 132, a segment type field and data value is added to each basket transaction. The data value uniquely identifies the first, second, third, or fourth segment type to which each basket transaction has been broadly and generally classified.

In some embodiments, each basket transaction of a segment type can also include a segment identifier, as depicted at 134. The segment identifier identifies the sub classifications for a basket transaction. The segment identifier identifies the data mining application (e.g., particular clustering application) that was used to ultimately sub classify the basket transaction. Accordingly, at 134, a number of basket transactions also include a segment identification field and data value, where the data value identifies the data mining application used to sub classify the basket transaction. The segment type and segment identifier values combine to provide attributes for a basket transaction. These attributes can be used during later analysis occurring against the basket transactions, which are now represented as a customer segmentation model. The attributes can be updated on a daily/weekly/quarterly basis and can be used to determine the accuracy of the clustering and factor analysis applications. Furthermore, previous attribute pairs can be used with new attribute pairs to track changes in segment behavior by comparing a period's performance against another period's performance while monitoring top selling products and top selling departments.

The newly generated customer segmentation model can then be used by the enterprise to perform more intelligent analysis on the four customer segment types and any segment identifiers. For example, at 140, and in one embodiment, the customer segmentation model is provided to an OLAP application in order to generate reports, these reports can show relationships between departments within a store. These reports give a detailed picture of segments showing their revenue contribution, profit contribution, discount store distribution, favorite goods or services, top selling goods or services, and many others. Moreover, the reports can be used to show that when customers purchase milk they are also likely to purchase bread and eggs (e.g., product affinity relationships or department affinity relationships). Of course, the relationships may not be as intuitive as this, in fact relationships can be discerned that were previously not expected, such as moving the beverage department closer to the deli may increase the sales of beverages. In this way, an enterprise can increase sales potential with each segment in a more systematic manner.

The newly generated customer segmentation model can be used by any existing enterprise analysis or report application in order to monitor the various segments on a continual and frequent basis.

As one of ordinary skill in the art now appreciates, method 100 can be deployed by an enterprise in order to classify basket transactions into four broad and general customer segment types. Each basket transaction is modified to include this segment type information in order to make a more usable collection of basket transactions (e.g., generated customer segmentation model) that can then be more intelligently analyzed by an enterprise to improve sales, profitability, optimize pricing, decide promotions, compare performance, identify seasonal effects, change store layout, understand customer preferences, optimize stock, and the like. A number of the segment types can also be further sub classified into groups and appropriately identified with the segment identification information. Therefore, more granular analysis on any particular segment type can be performed. Thus, automatically classifying and organizing the basket transactions into segment types and segment identifications that are of significance to an enterprise can result in better analysis, tracking, and/or reporting by the enterprise.

Figure 2:
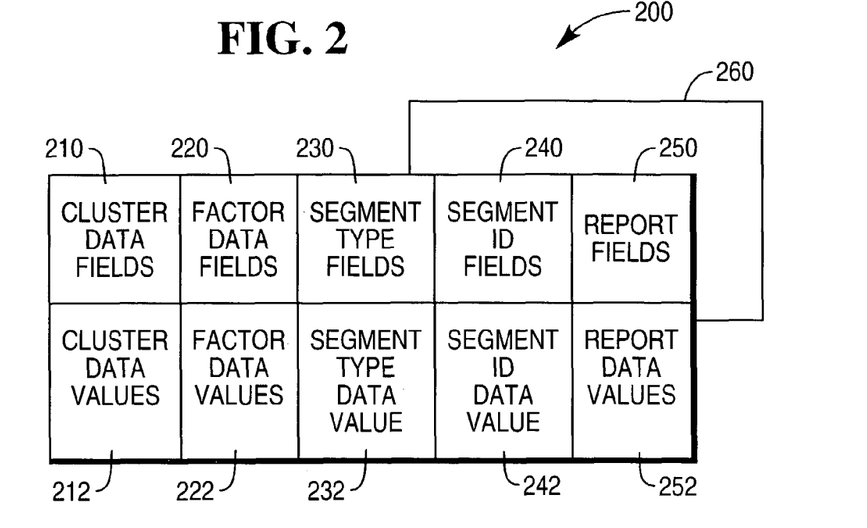
FIG. 2 is a diagram representing a customer segmentation model data structure, according to the teachings of the present invention.

FIG. 2 illustrates a diagram representing one customer segmentation model data structure 200, according to the teachings of the present invention. The customer segmentation model 200 includes a plurality of prefabricated (e.g., manual, automatic, of a combination of manual and automatic) and augmented basket transactions 260. This collection of basket transactions 260 need not reside on a single computer readable medium. In fact, the customer segmentation model 200 can reside in a plurality of storage locations and logically assembled by an application. In one embodiment, the customer segmentation model 200 resides in a data warehouse, such as the Teradata data warehouse distributed by NCR Inc. of Dayton, Ohio. Of course it is readily apparent that the customer segmentation model 200 can reside in a single database, electronic file, or a plurality of databases and electronic files.

Each basket transaction of the customer segmentation model 200 includes cluster data fields 210, factor data fields 220, a segment type field 230, a segment identification field 240, and optionally report fields 250. Of course it is readily understood by one of ordinary skill in the art that the customer segmentation model 200 need not be a fielded data structure, and in these instances the fields depicted in FIG. 2 can be data tags that identify the start of any particular type of data. In this way, and in some embodiments, the customer segmentation model 200 can be a tagged structure that uses any existing or ad hoc data-tagging format (e.g. Extensible Markup Language (XML), Hypertext Markup Language (HTML), Portable Document Format (PDF), and others).

Each of the fields, or tags as the case may be, includes an associated data value that includes actual values for each field. Thus, the cluster data fields 210 include cluster data values 212, the factor data fields 220 include factor data values 222, the segment type field 230 includes a segment type data value, the segment identification field 240 includes a segment identification data value 242, and the report fields 250 include report data values 252.

One or more factoring applications use the factor data fields 220 to classify a number of the basket transactions into a first segment type (e.g., irregular), a second segment type (e.g., convenience), a third segment type (e.g., destination), and a fourth segment type (e.g., variety). Classification is achieved by repetitively analyzing the collection of basket transactions 260 using the factoring applications until each of the basket transactions are classified into one of the four broad and general segment types. The first segment type represents an irregular segment for transactions with data quality problems, such as returns, frauds, and the like. The second segment type represents a convenience segment, the third segment type represents a destination segment, and the fourth segment type represents a variety segment. In one embodiment a Hotelling iterative procedure is used against and aggregated revenue information by department for a store in order to separate the basket transactions into the segment types. The factoring application uses the factor data fields 220 to classify the basket transactions into one of the four broad and general segment types.

One or more clustering applications use the cluster data fields 210 to subdivide or sub classify the collection of basket transactions 260 in a number of the segment types into sub segments of sub classifications (e.g., items purchased, departments visited, and others). In one embodiment, these cluster data fields 210 include a revenue data field, a discount data field, a profit data field, a total number of items purchased data field, and a total number of departments visited data field. Furthermore, in one embodiment, an EM algorithm is used to analyze the cluster data values 212 associated with each of the cluster data fields 210 in order to sub classify the collection of basket transactions 260 with a defined segment type into sub segments with the defined segment type. However, it is to be noted that the present invention can work with other clustering algorithms, such as, but not limited to K-means, and others.

Once the collection of basket transactions are classified into their appropriate segment type and a number of the segment types are further subdivided into sub segments, the segment identification field 240 for a number of the basket transactions can be populated with a segment identifier data value 242 that represents the appropriate sub segment to which each basket transaction belongs within a defined segment type belongs. The segment identifier's data value 242 can also be used to identify the clustering application that was used to sub classify the basket transaction. During the classification phase the segment type field 230 can be populated with a segment type value 232 that represents the specific segment type to which the basket transaction belongs.

The segment identification data value 232 and the segment type data value 242 for each basket transaction can be used as classification attributes for each basket transaction. The attributes can be used to track and monitor changes in behavior of the four segments. The attribute can also be used to validate and modify the accuracy and selection of data mining applications (e.g., clustering application) that were used to sub classify a number of the basket transactions.

The report data fields 250 and their corresponding report data values 252 can include, among other things, some of the same fields that were used for the cluster data fields 210 and factor data fields 220. Moreover, the report data fields 250 can include fields for product/service tax information, date of transaction data, time of transaction data, store identification data, sale terminal identification data, store type data, store size data, and others. The report data fields 250 and their corresponding report data values 252 can be used by an enterprise's reporting or monitoring applications to generate reports or tracking data regarding the four segments. In some embodiments, the reports applications include OLAP applications that are generally used by enterprises to summarize business data for purposes of analysis and planning.

As is readily apparent to one of ordinary skill in the art, the cluster data fields 210, the factor data fields 220, and the report fields 250 can overlap within the customer segmentation model 200. This does not mean that data values or fields are redundantly repeated within any single modified and augmented basket transaction, since the fields themselves can be logically identified within a schema for the customer segmentation model and need not be physically present and redundantly represented within each individual basket transaction. Thus, the relationships of the fields are logical and not physical, such that any single field occurs only once within each basket transaction.

The customer segmentation model 200 permits raw or unmodified basket transactions to be fabricated and ordered in a fashion that is more usable and meaningful to an enterprise. The addition of the segment type fields 230 and the segment identification fields 240, allow the enterprise to use existing report and tracking applications to learn how segments change behaviors, to learn relationships between goods, services, departments, stores, and the like, and to in some instance tailor marketing to specific segments. This permits an enterprise to more efficiently and intelligently plan, forecast, and monitor its business.

Figure 3:
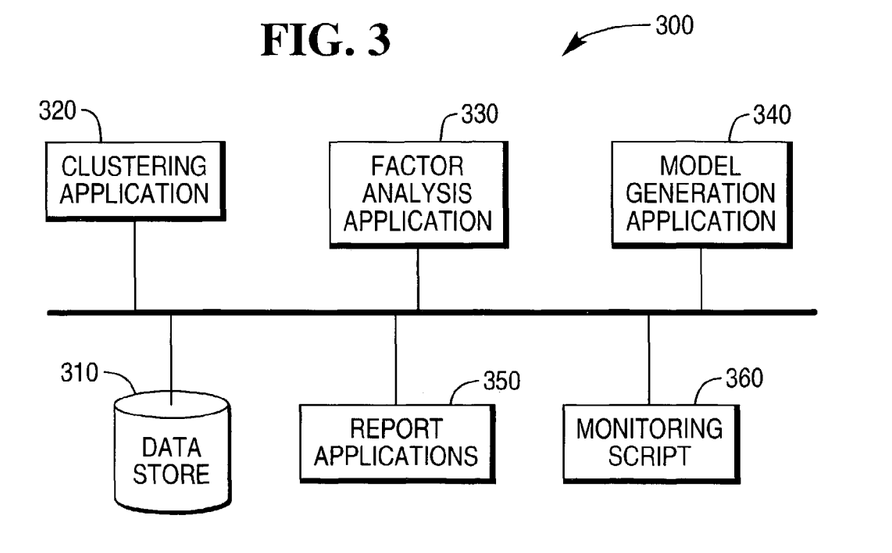
FIG. 3 is a diagram of a customer segmentation system, according to the teachings of the present invention.

FIG. 3 illustrates a diagram of one customer segmentation system 300, according to the teachings of the present invention. The customer segmentation system 300 is implemented in an electronic environment and the various components can be networked together via any type of network configuration. The customer segmentation system 300 includes a data store 310, a clustering application 320, a factor analysis application 330, a model generation application 340, optionally one or more report applications 350, and optionally a monitoring script 360.

The data store 310 can be a collection of disparate or similar databases, a collection of electronic files, a data warehouse, or a combination of these storage devices. In one embodiment, the data store 310 is a Teradata data warehouse distributed by NCR Inc. of Dayton, Ohio. The data store 310 is used in combination with a plurality of input devices (e.g., scanners, keyboards, computer mice, voice recognition devices, and others) and applications that permit basket transactions of an enterprise to be recorded within the data store 310. Moreover, as is readily apparent to one of ordinary skill in the art, the basket transactions are stored or recorded within the data store 310 in conformity to a schema for the basket transactions. The schema defines the captured fields and data values and their appropriate formats, valid data types, and valid data values.

The factor analysis application 330 repetitively performs analysis on the basket transactions in order to assign and associate each basket transaction with a first segment type (e.g., irregular), a second segment type (e.g., convenience), a third segment type (e.g., destination), and a fourth segment type (e.g., variety). In one embodiment, the factor analysis application 330 uses aggregated revenue information for various departments of a store or enterprise to make this determination. Furthermore, in one embodiment, the factor analysis application 330 uses a Hotelling iterative procedure, or any other factor analysis technique. An evaluation of the factor analysis application 330 can also produce clues to other relationships between items and/or departments of the enterprise.

Once the factor analysis application 330 has classified each basket transaction into one of the four segment types, the clustering application 320 is configured to analyze a transactions within a particular segment type in order to further subdivide or sub classify basket transactions with the particular segment type into a more granular classification. The sub classifications can relate to groups of transactions associated by items purchased or groups of transactions related to departments purchased from. Of course any other information that can be used to generate sub classifications within a particular segment type can be used to produce a variety, of other sub classifications. All such information and sub classifications are intended to fall within the broad scope of the present disclosure.

In some embodiments, the clustering application 320 uses revenue fields, discount fields, profit fields, department identifier fields, number of purchased items fields, and number of departments visited fields for each basket transaction included within the basket transactions of a particular segment type being analyzed. This is used to sub categorize or sub group basket transactions into more granular sub segments. Furthermore, in one embodiment, the clustering application 320 utilizes an EM algorithm, or any other clustering algorithm.

Once the factor analysis application 330 has analyzed the basket transaction, the basket transactions have been categorized into one of the four segment types. The first segment type represents irregular transactions, the second segment type represents convenience transactions for the enterprise, the third segment type represents destination transactions for the enterprise, and the fourth segment type represents variety transactions for the enterprise. A number of the basic transaction are also associated with sub classifications or sub segments after the clustering application 320 has processed any desired basket transactions with a desired segment type.

Next, the model generation application 340 augments the basket transactions in order to generate a customer segmentation model. The customer segmentation model is the categorized basket transactions with an added field representing a segment type. The data value for the segment type identifies one of the four segments. Each basket transaction includes the newly generated segment type field and its corresponding segment identifier data value. Moreover, a number of the basket transactions with a particular segment type include a segment identifier that identifies sub categories or sub groups to which a particular basket transaction within a particular segment type is associated.

In some embodiments, as the clustering application 320 and the sub classifies a number of the basket transactions into sub classifications, a segment identifier value is also added to these basket transactions associated with a newly added segment identification field. The segment identification value uniquely identifies the data mining application (e.g., clustering application 320) that last classified a basket transaction and the particular sub classification to which the classified basket transaction belongs. The segment identifier value and the segment type value combine to form a categorization attribute for a basket transaction. This attribute can be used to monitor segments, detect trends in segment behavior, and to iteratively improve the accuracy of the data mining applications.

Once the basket transactions are augmented with segment types and segment identifiers a customer segmentation model is produced. An enterprise can uses this organized collection of basket transactions to generate reports using one or more enterprise report applications 350. The report applications 350 consume the collection of basket transactions to generate reports for each of the segment types; the level of granularity of these reports can be tailored to the needs or desires of the enterprise.

In some embodiments, the system 300 also includes a monitor script 360 that is interfaced to the model generation application 340 and the data store 310. The monitor script 360 dynamically monitors basket transactions occurring and recorded in real time within the data store 310 and accesses the model generation application 340 in order to adjust the customer segmentation model, and to keep the customer segmentation model updated and accurate during ongoing operations of the enterprise.

As one of ordinary skill in the art now appreciates, the present disclosure permits previously unorganized basket transactions to be ordered into segment types and sub segments with a segment type that are of significance to an enterprise. These ordered segments represent a customer segmentation model that can be more easily analyzed by the enterprise using existing enterprise applications in order to improve the performance of the enterprise. The customer segmentation model can be used to increase sales, change store layout, optimize stock, optimize price, decide promotions, compare performance from different stores, understand how customer segment preferences change, identify seasonal effects on customer segments, and others.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

What is claimed is:

1. A computer-implemented method to generate a customer segmentation model, comprising:
   configuring a customer segmentation system including;
      a data store wherein the data store includes a plurality of applications including a clustering application, a factor analysis application, a model generation application, a reporting application and a monitoring application stored thereon,
   wherein the data store is configured to execute the plurality of applications with a processor, the plurality of applications instructing the customer segmentation system to:
      receive a basket of transactions that include a plurality of parameters including a cluster data parameter, a factor data parameter, a segment type parameter, a segment identification parameter and a report parameter, wherein the plurality of parameter logically links each parameter to the customer segmentation model;
      execute the factor analysis application that instructs the customer segmentation system to repetitively analyze and classify the basket of transactions according to the factor data parameter and assigns each of the basket of transactions into a plurality of predefined segments
      execute the cluster analysis application that instructs the customer segmentation system to analyze selective ones of the basket transactions according to the cluster data parameter and further sub classifies the selective ones of the basket of transactions into sub segments, wherein based on the plurality of segments, sub segments and the model generation application instructs the customer segmentation system to populate the segment identification parameter and segment type parameter of the basket transactions with a segment identification value and a segment type value;
      execute the monitoring application that instructs the customer segmentation system to one of validate or modify the executed cluster analysis application and model generation application, wherein the monitoring application includes a monitor script that dynamically monitors the basket of transactions; and
      executing the reporting application that instructs the customer segmentation system to derive new relationships between the segments by performing analysis on the plurality of parameters of the basket of transactions of the customer segmentation model.

2. The method of claim 1 further comprising providing the customer segmentation model to an Online Analytical Processing (OLAP) application to generate one or more OLAP reports that summarize attributes associated with the basket transactions classified in the customer segmentation model.

3. The method of claim 1 wherein in generating, each segment identifier value also identifies one of a plurality of data mining applications used to sub classify the basket transactions into one of the sub segments.

4. The method of claim 1 wherein in analyzing, the basket transactions are analyzed for a configured historical period of time.

5. A non-transitory computer readable medium having instructions stored thereon, when executed by one or more computers instruct a segmentation system to:
   execute a plurality of applications including a clustering application, a factor analysis application, a model generation application, a reporting application and a monitoring application,
   wherein the one or more computers are configured to execute the plurality of applications with one or more processors, the plurality of applications instructing the customer segmentation system to:
      receive a basket of transactions that include a plurality of parameters including a cluster data parameter, a factor data parameter, a segment type parameter, a segment identification parameter and a report parameter, wherein the plurality of parameter logically links each parameter to the customer segmentation model;

execute the factor analysis application that instructs the customer segmentation system to repetitively analyze and classify the basket of transactions according to the factor data parameter and assigns each of the basket of transactions into a plurality of predefined segments;

execute the cluster analysis application that instructs the customer segmentation system to analyze selective ones of the basket transactions according to the cluster data parameter and further sub classifies the selective ones of the basket of transactions into sub segments, wherein based on the plurality of segments, sub segments and the model generation application instructs the customer segmentation system to populate the segment identification parameter and segment type parameter of the basket transactions with a segment identification value and a segment type value;

execute the monitoring application that instructs the customer segmentation system to one of validate or modify the executed cluster analysis application and model generation application, wherein the monitoring application includes a monitor script that dynamically monitors the basket of transactions; and execute the reporting application that instructs the customer segmentation system to derive new relationships between the segments by performing analysis on the plurality of parameters of the basket of transactions of the customer segmentation model.

6. The computer readable medium of claim 5, wherein the monitor script that dynamically monitors the basket transactions, automatically executes with a day-to-day frequency, and interfaces with the model generation application to dynamically adjust the customer segmentation model.

7. The method of claim 1 wherein in generating, the customer segmentation model is generated by using a plurality of data mining applications.

8. A computer-implemented customer segmentation system, comprising:

one or more configured computers including one or more data stores wherein the one or more data stores include a plurality of applications including a clustering application, a factor analysis application, a model generation application, a reporting application and a monitoring application stored thereon, wherein the data store is configured to execute the plurality of applications with one or more processors, the plurality of applications instructing the customer segmentation system to:

receive a basket of transactions that include a plurality of parameters including a cluster data parameter, a factor data parameter, a segment type parameter, a segment identification parameter and a report parameter, wherein the plurality of parameter logically links each parameter to the customer segmentation model;

execute the factor analysis application that instructs the customer segmentation system to repetitively analyze and classify the basket of transactions according to the factor data parameter and assigns each of the basket of transactions into a plurality of predefined segments;

execute the cluster analysis application that instructs the customer segmentation system to analyze selective ones of the basket transactions according to the cluster data parameter and further sub classifies the selective ones of the basket of transactions into sub segments, wherein based on the plurality of segments, sub segments and the model generation application instructs the customer segmentation system to populate the segment identification parameter and segment type parameter of the basket transactions with a segment identification value and a segment type value;

execute the monitoring application that instructs the customer segmentation system to one of validate or modify the executed cluster analysis application and model generation application, wherein the monitoring application includes a monitor script that dynamically monitors the basket of transactions; and execute the reporting application that instructs the customer segmentation system to derive new relationships between the segments by performing analysis on the plurality of parameters of the basket of transactions of the customer segmentation model.

9. The customer segmentation system of claim 8 wherein the one or more data stores is at least one of a plurality of databases, a data warehouse, and a plurality of stored electronic files.

10. The customer segmentation system of claim 8 wherein the basket transactions represent data associated with purchasing transactions for at least one of an enterprise and a store of an enterprise.

11. The customer segmentation system of claim 8 wherein the clustering application uses an Expectation Maximization (EM) algorithm.

12. The customer segmentation system of claim 8 wherein the factor analysis application uses a Hotelling iterative procedure algorithm.

13. The customer segmentation system of claim 8 wherein the monitor script that dynamically monitors the basket transactions, automatically executes with a day-to-day frequency, and interfaces with the model generation application to dynamically adjust the customer segmentation model.

* * * * *